(12) United States Patent
Helms et al.

(10) Patent No.: US 9,083,513 B2
(45) Date of Patent: Jul. 14, 2015

(54) TECHNIQUE FOR SECURELY COMMUNICATING AND STORING PROGRAMMING MATERIAL IN A TRUSTED DOMAIN

(75) Inventors: William Helms, Longmont, CO (US);
Michael T. Hayashi, Aurora, CO (US);
Kevin J. Leddy, Wilton, CT (US);
David A. Christman, Rowayton, CT (US)

(73) Assignee: Time Warner Cable Enterprises LLC, New York, NY (US)

( * ) Notice: Subject to any disclaimer, the term of this patent is extended or adjusted under 35 U.S.C. 154(b) by 0 days.

(21) Appl. No.: 13/608,969

(22) Filed: Sep. 10, 2012

(65) Prior Publication Data
US 2013/0070922 A1    Mar. 21, 2013

Related U.S. Application Data

(62) Division of application No. 10/894,884, filed on Jul. 20, 2004, now Pat. No. 8,266,429.

(51) Int. Cl.
*H04L 9/32* (2006.01)
*H04N 7/167* (2011.01)
(Continued)

(52) U.S. Cl.
CPC ............ *H04L 9/0825* (2013.01); *H04N 7/1675* (2013.01); *H04N 21/2347* (2013.01);
(Continued)

(58) Field of Classification Search
CPC ........................................................ H04L 9/20
USPC ........................................... 380/200; 713/171
See application file for complete search history.

(56) References Cited

U.S. PATENT DOCUMENTS 5,369,707 A    11/1994  Follendore, III
5,577,209 A    11/1996  Boyle et al.
(Continued)

FOREIGN PATENT DOCUMENTS

JP         A-8-263440       11/1996
JP         A-2000-156676     6/2000
(Continued)

OTHER PUBLICATIONS

5C Digital Transmission Content Protection White Paper, Hitachi, Ltd., et al., dated Jul. 14, 1998, 15 pages.
(Continued)

*Primary Examiner* — Techane Gergiso
(74) *Attorney, Agent, or Firm* — Gazdzinski & Associates PC

(57) ABSTRACT

A "trusted domain" is established within which content received from a communications network, e.g., a cable TV network, is protected from unauthorized copying thereof, in accordance with the invention. In an illustrative embodiment, the trusted domain includes a device associated with a user which receives content from the cable TV network. The content may be encrypted using a content key in accordance, e.g., with a 3DES encryption algorithm before it is stored in the device. In addition, a first encrypted content key version and a second encrypted content key version are generated by respectively encrypting the content key with a public key associated with the device and another public key associated with the user, in accordance with public key cryptography. The first and second encrypted content key versions are stored in association with the encrypted content in the device storage. The encrypted content can be migrated from a first device to a second device, and can be decrypted in the second device in the second device is associated with the same user, and also provided with the second encrypted content key version.

19 Claims, 6 Drawing Sheets

(51) Int. Cl.
*H04L 9/08* (2006.01)
*H04N 21/2347* (2011.01)
*H04N 21/266* (2011.01)
*H04N 21/4405* (2011.01)
*H04N 21/6334* (2011.01)
*H04N 21/6377* (2011.01)

(52) U.S. Cl.
CPC ..... *H04N21/26613* (2013.01); *H04N 21/4405* (2013.01); *H04N 21/6334* (2013.01); *H04N 21/63775* (2013.01); *H04L 9/0822* (2013.01); *H04L 2209/60* (2013.01)

(56) References Cited

U.S. PATENT DOCUMENTS

| | | |
|---|---|---|
| 5,715,403 A | 2/1998 | Stefik |
| 5,787,172 A | 7/1998 | Arnold |
| 5,828,832 A | 10/1998 | Holden et al. |
| 5,870,474 A | 2/1999 | Wasilewski et al. |
| 6,148,400 A | 11/2000 | Arnold |
| 6,154,844 A | 11/2000 | Touboul et al. |
| 6,167,521 A | 12/2000 | Smith et al. |
| 6,212,636 B1 | 4/2001 | Boyle et al. |
| 6,233,341 B1 | 5/2001 | Riggins |
| 6,256,393 B1 | 7/2001 | Safadi et al. |
| 6,266,421 B1* | 7/2001 | Domyo et al. ............ 380/286 |
| 6,456,716 B1 | 9/2002 | Arnold |
| 6,742,116 B1* | 5/2004 | Matsui et al. ............ 713/171 |
| 6,760,768 B2 | 7/2004 | Holden et al. |
| 6,785,810 B1 | 8/2004 | Lirov et al. |
| 6,859,535 B1* | 2/2005 | Tatebayashi et al. ..... 380/201 |
| 6,898,708 B2 | 5/2005 | Hori et al. |
| 6,948,183 B1 | 9/2005 | Peterka |
| 6,975,730 B1 | 12/2005 | Kuroiwa et al. |
| 6,996,544 B2 | 2/2006 | Sellars |
| 7,017,189 B1 | 3/2006 | De Mello |
| 7,054,443 B1 | 5/2006 | Jakubowski et al. |
| 7,069,449 B2 | 6/2006 | Weaver et al. |
| 7,073,199 B1 | 7/2006 | Raley |
| 7,103,181 B2 | 9/2006 | Ananth |
| 7,237,112 B1 | 6/2007 | Ishiguro et al. |
| 7,257,227 B2 | 8/2007 | Chen et al. |
| 7,266,726 B1 | 9/2007 | Ladd |
| 7,299,502 B2 | 11/2007 | Schmeling et al. |
| 7,373,506 B2 | 5/2008 | Asano et al. |
| 7,409,546 B2 | 8/2008 | Platt |
| 7,506,367 B1* | 3/2009 | Ishibashi ................... 726/10 |
| 7,757,101 B2 | 7/2010 | Nonaka et al. |
| 7,865,440 B2 | 1/2011 | Jaquette |
| 2001/0014946 A1 | 8/2001 | Ichinoi |
| 2001/0019614 A1 | 9/2001 | Madoukh |
| 2001/0029581 A1 | 10/2001 | Knauft |
| 2001/0053223 A1 | 12/2001 | Ishibashi et al. |
| 2001/0053226 A1 | 12/2001 | Akins et al. |
| 2001/0056541 A1* | 12/2001 | Matsuzaki et al. ........ 713/193 |
| 2002/0026575 A1 | 2/2002 | Wheeler et al. |
| 2002/0062440 A1* | 5/2002 | Akama ...................... 713/171 |
| 2002/0183985 A1 | 12/2002 | Hori et al. |
| 2002/0199105 A1* | 12/2002 | Ishiguro et al. ........... 713/168 |
| 2003/0009681 A1 | 1/2003 | Harada et al. ............ 713/193 |
| 2003/0021421 A1 | 1/2003 | Yokota et al. ............ 380/277 |
| 2003/0046560 A1* | 3/2003 | Inomata et al. ............ 713/189 |
| 2003/0056217 A1 | 3/2003 | Brooks |
| 2003/0074571 A1* | 4/2003 | Fujiwara et al. .......... 713/191 |
| 2003/0084003 A1 | 5/2003 | Pinkas et al. |
| 2003/0097340 A1* | 5/2003 | Okamoto et al. ........... 705/65 |
| 2003/0140227 A1 | 7/2003 | Asano et al. |
| 2003/0163697 A1 | 8/2003 | Pabla et al. |
| 2003/0208763 A1 | 11/2003 | McElhatten |
| 2003/0217365 A1 | 11/2003 | Caputo |
| 2004/0078602 A1 | 4/2004 | Rothbarth et al. |
| 2004/0088558 A1* | 5/2004 | Candelore ................... 713/193 |
| 2004/0123129 A1 | 6/2004 | Ginter et al. |
| 2004/0128499 A1 | 7/2004 | Peterka et al. |
| 2004/0224425 A1 | 11/2004 | Gjerde |
| 2005/0021985 A1* | 1/2005 | Ono et al. ................... 713/193 |
| 2005/0022227 A1 | 1/2005 | Shen et al. |
| 2005/0039212 A1 | 2/2005 | Baran et al. |
| 2005/0065888 A1 | 3/2005 | Benaloh |
| 2005/0114900 A1 | 5/2005 | Ladd |
| 2005/0177740 A1 | 8/2005 | Athaide et al. |
| 2005/0177741 A1 | 8/2005 | Chen et al. |
| 2005/0182931 A1 | 8/2005 | Robert et al. |
| 2005/0190912 A1 | 9/2005 | Hopkins et al. |
| 2005/0195975 A1 | 9/2005 | Kawakita |
| 2005/0278259 A1 | 12/2005 | Gunaseelan et al. |
| 2006/0020786 A1 | 1/2006 | Helms et al. |
| 2006/0020950 A1 | 1/2006 | Ladd |
| 2006/0036750 A1 | 2/2006 | Ladd |
| 2006/0041903 A1 | 2/2006 | Kahn et al. |
| 2006/0047957 A1 | 3/2006 | Helms et al. |
| 2006/0064583 A1 | 3/2006 | Birnbaum et al. |
| 2006/0130107 A1 | 6/2006 | Gonder |
| 2006/0130113 A1 | 6/2006 | Carlucci |
| 2006/0137015 A1 | 6/2006 | Fahrny et al. |
| 2007/0022459 A1 | 1/2007 | Gaebel |
| 2007/0079381 A1 | 4/2007 | Hartung et al. |
| 2007/0094691 A1 | 4/2007 | Gazdzinski |
| 2007/0204314 A1 | 8/2007 | Hasek |
| 2007/0217436 A1 | 9/2007 | Markley |

FOREIGN PATENT DOCUMENTS

| | | |
|---|---|---|
| JP | A-2000-332746 | 11/2000 |
| JP | A-2001-274786 | 10/2001 |
| JP | A-2001-285821 | 10/2001 |
| JP | A-2002-163396 | 6/2002 |
| JP | A-2002-352094 | 6/2002 |
| JP | 2002352094 | 12/2002 |
| JP | A-2003-58657 | 2/2003 |
| JP | A-2003-162600 | 6/2003 |
| JP | A-2003-233690 | 8/2003 |
| JP | A-2003-248508 | 9/2003 |
| JP | A-2003-296484 | 10/2003 |
| JP | A-2003-348508 | 12/2003 |
| JP | A-2004-72721 | 3/2004 |
| JP | A-2004-120736 | 4/2004 |
| JP | A-2004-303111 | 10/2004 |
| JP | A-2005-506627 | 3/2005 |
| JP | 2008-507905 | 3/2008 |
| WO | WO 01/03410 | 1/2001 |
| WO | WO 01/37479 | 5/2001 |
| WO | WO/01/69842 | 9/2001 |
| WO | WO 01/77778 | 10/2001 |
| WO | WO 01/03410 | 11/2001 |
| WO | WO 02/13032 | 2/2002 |
| WO | WO 02/21841 | 3/2002 |
| WO | WO 02/42966 | 5/2002 |
| WO | WO 03/093944 | 11/2003 |
| WO | WO 2004/027622 | 4/2004 |
| WO | WO/2006-020141 | 2/2006 |

OTHER PUBLICATIONS

High-bandwidth Digital Content Protection System, Revision 1.091, dated Apr. 22, 2003, Digital Content Protection LLC Draft, 78 pages.
Digital Video Broadcasting, (DVB); DVB SimulCrypt; Part I: "Head-end architecture and synchronization" Technical Specification—ETSI TS 101 197 V.1 (Feb. 2002), 40 pages.
Federal Information Processing Standards Publication, US FIPS Pub 197, Nov. 26, 2001, "Advanced Encryption Standards (AES)," 47 pages.
DCAS Authorized Service Domain, Version 1.2, dated Nov. 4, 2008, 54 pages.
DCAS Licensed Specification Abstracts, CableLabs Confidential Information, Jan. 12, 2006, 4 pages.
RealSystem Media Commerce Suite Technical White Paper, .Copyrgt, 2001 RealNetworks, Inc., 16 pages, http://www.realnetworks.com.
Digital Rights Management, Technical White Paper, Alcatel Telecommunications Review, 2.sup.nd Quarter 2003, 8 pages.

(56) References Cited

OTHER PUBLICATIONS

A Flexible Content Protection System for Media-on-Demand, by Jian Zhang, et al,, IBM China Research Lab, Proceedings of the IEEE Fourth International Symposium on Multimedia Software Engineering (MSE'02), 6 pages.

'OCAP 2.0 Profile, OC-SP-OCAP2.0401-020419', Apr. 19, 2002, Cable Television Laboratories, Inc. article 'OpenCable Application Platform Specification'.

'OC-SP-HOSR-CFR-113-030707', Jul. 7, 2003, Cable Television Laboratories, Inc. article 'OpenCableTm Host Device Core Functional Requirements'.

'OC-SP-HOSTPOD-IF-113-030707', Jul. 7, 2003, Cable, Television Laboratories, Inc. article 'OpenCableTm HOST-POD Interface Specification'.

* cited by examiner

| STID | SUBSCRIBER ID |
|---|---|
| MAC-1 | S-1 |
| MAC-2 | S-1 |
| MAC-3 | S-2 |

363 = STID column
364 = SUBSCRIBER ID column
368-1 = MAC-1 / S-1 row
368-2 = MAC-2 / S-1 row

| STID | DEVICE PUBLIC KEY |
|---|---|
| MAC-1 | DPUBKEY-1 |
| MAC-2 | DPUBKEY-2 |
| MAC-3 | DPUBKEY-3 |
| ⋮ | ⋮ |
| MAC-M | DPUBKEY-M |

276 = STID column
277 = DEVICE PUBLIC KEY column
279-1 = MAC-1 / DPUBKEY-1 row

283

| SUBSCRIBER ID | SUBSCRIBER PUBLIC KEY | SUBSCRIBER PRIVATE KEY |
|---|---|---|
| S-1 | SPUBKEY-1 | SPRIKEY-1 |
| S-2 | SPUBKEY-2 | SPRIKEY-2 |
| S-3 | SPUBKEY-3 | SPRIKEY-3 |

610

TECHNIQUE FOR SECURELY COMMUNICATING AND STORING PROGRAMMING MATERIAL IN A TRUSTED DOMAIN

PRIORITY

This application is a divisional of and claims priority to co-owned U.S. patent application Ser. No. 10/894,884 of the same title filed Jul. 20, 2004 and issuing as U.S. Pat. No. 8,266,429, which is incorporated herein by reference in its entirety.

FIELD OF THE INVENTION

The invention relates to a communications technique, and more particularly to a technique for securely communicating and storing programming material in a communications system, e.g., a cable TV system.

BACKGROUND OF THE INVENTION

A set-top terminal (STT) serves as a gateway between a user's television and a cable TV network delivering programming content. Such programming content may be delivered as a broadcast. It may also be delivered on an on-demand basis, for which services such as video on demand (VOD), subscription VOD, movies on demand, etc., are offered. In addition, a "network personal video recorder (NPVR)" service has been developed, allowing the user to perform trick mode functions (rewind, fast-forward, pause, etc.) on a presentation of programming content through use of a network. In fact, a network architecture and functionalities for implementing the NPVR service are described, e.g., in copending commonly assigned application Ser. No. 10/302,550, filed on Nov. 22, 2002, hereby incorporated by reference. The NPVR service also allows a user to "reserve" past and future programs for his/her review, even if such reserved programs were not identified by the user before their broadcast.

An STT receives, through the cable TV network, programming content which may be encrypted, e.g., in accordance with the data encryption standard (DES) technique, to secure its delivery. DES is a well known symmetrical cipher which utilizes a single key for both encryption and decryption of messages. Because the DES algorithm is publicly known, learning the DES key would allow an encrypted message to be read by anyone. As such, both the message sender and receiver must keep the DES key a secret from others. A DES key typically is a sequence of eight bytes, each containing eight bits. To enhance the DES integrity, the DES algorithm may be applied successive times. With this approach, the DES algorithm enciphers and deciphers data, e.g., three times in sequence, using different keys, resulting in a so-called triple DES (3DES) technique.

In contrast to the DES technique, a public key encryption technique, e.g., an RSA technique (named for its developers, Rivest, Shamir, and Adleman), uses two different keys. A first key, referred to as a private key, is kept secret by a user. The other key, referred to as a public key, is available to anyone wishing to communicate with the user in a confidential manner. The two keys uniquely match each other, collectively referred to as a "public key-private key pair." However, the private key cannot be easily derived from the public key. A party wishing to send a message to the user may utilize the public key to encrypt a message before transmitting it. The user then utilizes the private key to decrypt the message. Conversely, the private key may be used to encrypt a message, in which case the message can subsequently be decrypted with the public key. For example, the keys for the RSA algorithm are mathematically generated, in part, by combining prime numbers. The security of the RSA algorithm, and the like, depends on the use of very large numbers for its keys, which typically are 512 bits long.

In prior art, programming content may be encrypted using a DES key, in accordance with a DES algorithm, to secure its delivery from a headend of a cable TV system to an STT. In order for the STT to decrypt the encrypted programming content, the DES key is transmitted from the headend to the STT in an entitlement control message (ECM), which is encrypted using a 3DES key in accordance with a 3DES algorithm. The 3DES key (also known as a "multi-session key (MSK)") is sent to the STT in a separate entitlement management message (EMM), which is encrypted using an STT public key in accordance with a public key algorithm, whose private key counterpart is securely maintained in the STT. Thus, after receiving the encrypted EMM and ECM, the STT decrypts the encrypted EMM using the STT private key to obtain the 3DES key therein. Using such a 3DES key, the STT decrypts the encrypted ECM to obtain the DES key therein. Using such a DES key, the STT can decrypt the encrypted programming content it received.

Recently, some STTs for cable TV were improved to incorporate digital video recorder (DVR) functions ("DVR STTs"). Like a DVR, e.g., a TiVo or ReplayTV device, a DVR STT typically includes a hard drive, e.g., a disk, for digitally recording TV programs. Also like a DVR, a DVR STT allows a cable TV subscriber to record his/her favorite TV programs for later review, and exercise a season-pass-like option to record every episode of his/her favorite program for a period. It may automatically record programs for the user based on his/her viewing habit and preferences. The presentation of the recorded programming content can be manipulated by exercising rewind, pause and fast-forward functions.

However, cable operators have observed that providing to subscribers unrestricted content might result in an unacceptable amount of unauthorized copying. Accordingly, there is a continuing need for a strategy that allows content to be stored by a subscriber, but at the same time prevents (or controls) copying and distributing the content to unauthorized parties. A number of techniques have been developed to address this need. One such technique involves use of an indicator, e.g., an encryption mode indicator (EMI), which may be inserted into a data stream used to transmit content from a source device to a destination device. The EMI provides to the destination device information concerning the status of the content; the status may indicate that the content can be freely copied, copied once, never copied, etc. The destination device reads the EMI and determines whether or not the content may be copied. If copying is permitted, the destination device may then copy the content. For details on such a content protection technique, one may refer to: "SC Digital Transmission Content Protection White Paper," Hitachi, Ltd et al., Revision 1.0, Jul. 14, 1998.

Another technique requires a device intending to transmit protected content to determine whether or not the receiving device is authorized to receive such content. This may be achieved, e.g., by requiring the receiving device to demonstrate knowledge of a set of secret device keys. Only after the receiving device has established its legitimacy does the transmitting device deliver the content. An example of one such content protection system is described in "High-Bandwidth Digital Content Protection System," Digital Content Protection LLC, Revision 1.1, Jun. 9, 2003.

Similarly, there is a need for a strategy that enables a subscriber to perform authorized copying of protected content, e.g., copying content from a set-top terminal to a second device in the subscriber's home, while at the same time preventing unauthorized copying. This need is of growing importance given the increasing popularity of home networking. In recent years, numerous systems for providing interconnectivity among devices in a home have been developed, allowing home networks to include not only cable set-top terminals but also personal computers, cellphones, PDA devices, etc. An example of a system for interconnecting various devices in a home is described in International Patent Application Publication No. WO 02/121841, published on Mar. 14, 2003.

SUMMARY OF THE INVENTION

The invention overcomes the prior art limitations by defining a "trusted domain" within which programming content is protected from unauthorized access and copying. For example, in a cable TV system, the trusted domain includes not only the system portion where programming content traditionally is secured by, and within total control of, a cable operator, including, e.g., the headend, delivery network, etc., but also user devices at subscribers' premises which are capable of receiving and securely storing programming content. Using the inventive trusted domain approach, the cable operator can guarantee certain subscriber access and usage with respect to content held within the domain. For example, a motion picture held within a cable operator's trusted domain (e.g., on a hard drive of a user device) cannot be distributed over the Internet in viewable form and cannot become a source for duplication of multiple viewable copies.

To realize a trusted domain, two cryptographic elements (e.g., encryption keys), associated with a subscriber and his/her user device(s), respectively, are utilized to control access to content stored in the user device(s) within the domain. For example, the stored content in the user device may be encrypted using a secret key in accordance with a DES technique. Thus, when the encrypted content is transported from the user device to a new device associated with the same subscriber within the domain, the new device needs a first cryptographic element (e.g., the secret key) to decrypt the encrypted content for viewing. To that end, the new device also receives from the source device a first encrypted version of the first cryptographic element. The latter is generated by encrypting the first cryptographic element using a second cryptographic element (e.g., a public key in accordance with a public key algorithm) associated with the subscriber. The new device provides the first encrypted version of the first cryptographic element to a remote apparatus, e.g., in a headend, where the first cryptographic element is recovered based on at least the first encrypted version of the first cryptographic element and data representative of the subscriber. The new device then receives from the apparatus a second encrypted version of the first cryptographic element. The latter is generated by encrypting the recovered first cryptographic element using a third cryptographic element (e.g., a public key in accordance with a public key algorithm) associated with the new device. Based on at least the second encrypted version of the first cryptographic element, the first cryptographic element can be recovered in the new device to decrypt the encrypted content transported thereto.

In one aspect, a method for use in a first client device of a content distribution network is disclosed. In one embodiment, the network comprises at least a network entity and a plurality of client devices, and the method comprises: (i) receiving encrypted content at the first device, (ii) receiving a first encrypted version of a cryptographic element, (iii) receiving a second encrypted version of the cryptographic element from the network entity, (iv) deriving the cryptographic element using at least one of the first and second encrypted versions of the cryptographic element, and (v) decrypting the encrypted content using the cryptographic element.

In a second aspect, a method for use in an apparatus for decrypting encrypted content in a device remote from the apparatus is disclosed. In one embodiment, the encrypted content in the device is decrypted using a content key, and the method comprises: (i) receiving from the device a first encrypted content key, (ii) obtaining a first cryptographic element associated with a user of the device, (iii) using the first cryptographic element to decrypt the first encrypted content key, thereby recovering the content key, (iv) using a second cryptographic element associated with the device to encrypt the recovered content key, thereby generating a second encrypted content key, and (v) providing the second encrypted content key to the device, the content key being recoverable based on at least in part on the second encrypted content key.

In a third aspect, a computerized apparatus is disclosed. In one embodiment, the apparatus comprises: (i) first logic configured to receive a first encrypted content key that has been encrypted by a first cryptographic element associated with a user, (ii) second logic configured to decrypt the first encrypted content key based at least in part upon data representative of the user, (iii) third logic configured to generate a second encrypted content key by encryption of the decrypted first content key using a second cryptographic element, and (iv) fourth logic configured to transmit the second encrypted content key to a receiving device.

In a fourth aspect, an apparatus configured to enable decryption of encrypted content in a device remote from the apparatus is disclosed. In one embodiment, the encrypted content in the device is decrypted using a content key, and the apparatus comprising: (i) an interface configured to receive from the device a first encrypted content key, (ii) a database configured to supply a first cryptographic element associated with a user of the device, (iii) an entity configured to recover the content key by decrypting the first encrypted content key using the first cryptographic element, (iv) an apparatus configured to generate a second encrypted content key via encryption of the recovered content key using a second cryptographic element associated with the device, and (v) a server configured to provide at least the second encrypted content key to the device, the content key recoverable based at least on the second encrypted content key.

In a fifth aspect, a client device configured to decrypt encrypted content using a cryptographic element is disclosed. In one embodiment the client device is in communication with a content distribution network, the network comprising at least a network entity and a plurality of second client devices. The client device comprises a first interface configured to receive said encrypted content from one of said plurality of second client devices, a second interface configured to receive a first encrypted version of the cryptographic element from the one of the plurality of second client devices, the first encrypted version of the cryptographic element being generated via encryption of the cryptographic element using a second cryptographic element associated with a common user of the client device and the one of the plurality of second client devices, a third interface configured to receive a second encrypted version of the cryptographic element from the network entity, and a processor apparatus. The processor apparatus is configured to execute at least computer program, said computer program comprising a plurality of instructions which are configured to, when executed: derive said cryptographic element using at least one of the first and second encrypted versions of the cryptographic element and decrypt the encrypted content using the cryptographic element.

BRIEF DESCRIPTION OF THE DRAWINGS

Further objects, features and advantages of the invention will become apparent from the following detailed description taken in conjunction with the accompanying drawing showing illustrative embodiments of the invention, in which:

FIG. 2 illustrates a subscriber registry maintained in a headend of the system of FIG. 1;

FIG. 3 illustrates a device key table maintained in a headend of the system of FIG., 1;

DETAILED DESCRIPTION

The invention is directed to a technique for securing programming content within a protected area from unauthorized access and copying. Such a protected area hereinafter is referred to as a "trusted domain." In a cable TV system, the trusted domain includes not only the system portion where programming content traditionally is secured by, and within total control of, a cable operator, including, e.g., the headend, delivery network, etc., but also user devices at subscribers' premises which are capable of receiving and storing programming content, e.g., a DVR STT, and which implement a conditional access mechanism in accordance with the invention. For the sake of convenience, a DVR STT which implements the inventive conditional access mechanism hereinafter is referred to as a "secure DVR STT (SDVR STT)." The trusted domain may further encompass other devices at a subscriber's premises, e.g., a series of devices connected (wired or wireless) to an SDVR STT, which hold or exchange data encrypted through, and managed under, the inventive conditional access mechanism. The trusted domain is intact with respect to the stored content so long as the content remains so encrypted and continues to be managed under the inventive mechanism, regardless of which device holds the content. Once the content is decrypted by the conditional access mechanism, for example, when data is sent from the SDVR STT to a television monitor for display, the decrypted content is no longer within the trusted domain, and may no longer be secure.

Using the inventive trusted domain approach, the cable operator can guarantee certain subscriber access and usage with respect to content held within the domain. For example, a motion picture held within a cable operator's trusted domain (e.g., on a hard drive of an SDVR STT) cannot be distributed over the Internet in viewable form and cannot become a source for duplication of multiple viewable copies. On the other hand, a motion picture held outside the trusted domain (e.g., in unencrypted form on a third party's DVR hard drive) can be distributed over the Internet or copied onto removable media in viewable form.

Figure 1:
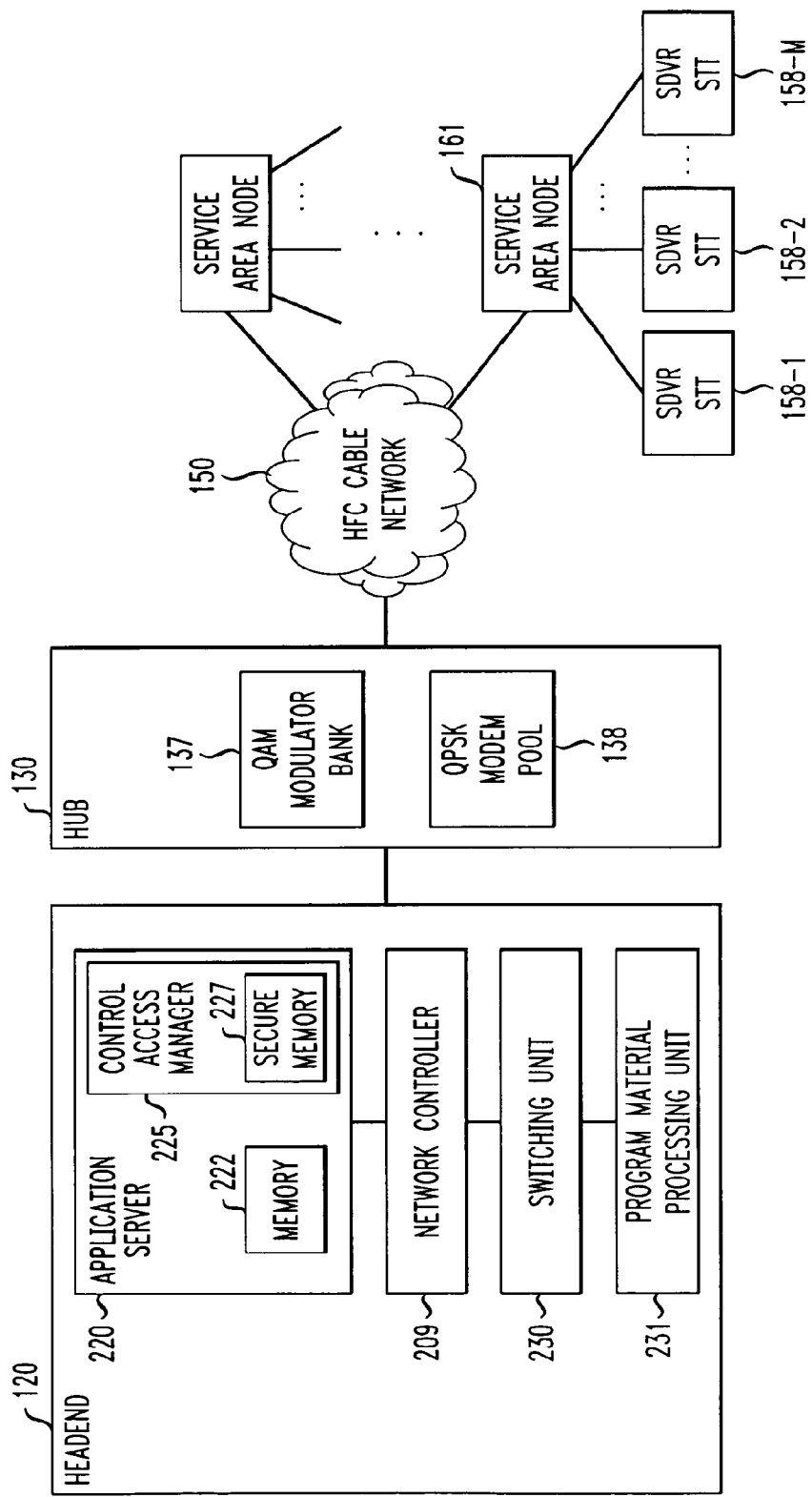
FIG. 1 illustrates components of a broadband communications system, in accordance with an embodiment of the invention.

FIG. 1 illustrates components of a broadband communications system, e.g., a cable TV system, embodying the principles of the invention. Headend 120 receives programming content attributed to various program channels, and provides cable television services to STTs including, e.g., SDVR STTs 158-1 through 158-M, where M represents an integer. It should be noted that the same cable television services are also provided to prior art STTs with no programming content storage capability which, however, are not of interest here. It should also be noted that the terms "transmission channel" and "program channel" should not be confused. A "transmission channel" signifies a designated frequency band through which a transport stream containing programming content and/or data is transmitted. A "program channel" signifies the source of programming content or the service selected by a user to view. For example, a user may select program channel 2 to view programming content provided by CBS, program channel 14 to view programming content provided by ESPN, etc.

In a conventional manner, headend 120 delivers programming content downstream to SDVR STTs 158-1 through 158-M in a service area or neighborhood, where M represents an integer. As shown in FIG. 1, SDVR STTs 158 are connected to network 150 through a service area node 161. In this instance, network 150 is a multi-channel delivery network comprises a well-known hybrid fiber coaxial (HFC) cable network.

Programming content is delivered downstream from headend 120 to SDVR STTs 158 through "in-band" transmission channels. In one embodiment, these transmission channels may be 6 MHz bands populating a forward passband, e.g., 350-750 MHz band, of a coaxial cable. QAM modulator bank 137 in hub 130 modulates the transport streams containing the programming content onto selected in-band channels, in accordance with a QAM scheme.

In addition, downstream data, e.g., control messages, emergency information, etc., may be communicated from headend 120 to SDVR STTs 158 via one or more forward data channels (FDCs), sometimes referred to as "out-of-band" channels. The FDCs may occupy the 70-130 MHz band of a coaxial cable. QPSK modem pool 138 in hub 130 modulates downstream data onto selected FDCs, in accordance with a QPSK scheme.

Upstream data, e.g., application data, file requests, etc., may be transmitted from SDVR STTs 158 to headend 120 via one or more reverse data channels (RDCs), which occupy a reverse passband, e.g., 5-40 MHz band, of a coaxial cable. The data traversing the RDCs is modulated in accordance with a QPSK scheme. QPSK modem pool 138 in hub 130 receives the QPSK signals containing the data from the RDCs and performs any necessary demodulation before transmitting the underlying data to headend 120. Using a contentionbased access mechanism established by the Digital Audio Visual Council (DA VIC), a standard setting organization, each STT can share an RDC with other STTs in the network. This mechanism enables an STT, e.g., SDVR STT 158-1, to transmit upstream messages without a dedicated connection to a QPSK demodulator. The mechanism also provides equal access to the STTs that share the RDC, and enables detection and recovery from reverse path collisions that occur when two or more of the STTs transmit an upstream message simultaneously. As also specified by DAVIC, for communications purposes, each STT and network controller 209 are identified by the Internet protocol (IP) addresses assigned thereto. However, these IP addresses may be randomly assigned each time the broadband communication system is reconfigured. As a result, the IP address of an STT or that of network controller 209 may change after a system reconfiguration. Nevertheless, each STT and network controller 209 are also assigned a media access control (MAC) address on a permanent basis, surviving any system reconfiguration.

Headend 120 includes, among others, program material processing unit 231, application server 220, network controller 209, and switching unit 230. In a well-known manner, program material processing unit 231 receives programming content from various sources attributed to different program channels, and generates transport streams containing the programming content, e.g., in accordance with a well known MPEG-2 scheme. Under control of network controller 209, the transport streams are switched by switching unit 230 to appropriate modulators in QAM modulator bank 137 in hub 130, where the transport streams are modulated onto the corresponding in-band transmission channels for delivery to STTs over network 150.

Application server 220 may include one or more server systems that provide software applications and services for STT users. For example, application server 220 may contain one or more software applications for providing database services, network management services, interactive program guide services, billing services, etc. Server 220 may maintain in memory 220 a subscriber registry, denoted 360 in FIG. 2. Registry 360 is illustrated in the form of a table, where column 363 includes, for each STT in the system, an identifier identifying the STT (STID). In this example, each STT is identified by its MAC address. For example, SDVR STT 158-1 may be identified by a MAC address denoted MAC-I. Column 364 includes a subscriber ID (e.g., subscriber's name, ID number, etc.) identifying a subscriber to the cable television services who is associated with each respective STT. For example, referring to row 368-1, STT 158-1 is associated with the subscriber identified by S-I. In this example, subscriber S-1 may be, for example, an individual who purchased or leased SDVR STT 158-1 and registered with the operator as the user thereof. It should be noted that a given subscriber may be associated with more than one STT. Referring to row 368-2, for example, SDVR STT 158-2 is also associated with subscriber S-I. In this example, subscriber S-1 may have purchased or leased STT 158-2 for use as a second STT in his or her home.

In this instance, application server 220 also includes access control manager 225 for realizing the aforementioned access control mechanism in accordance with the invention. To that end, manager 225 maintains access control related data pertaining to SDVR STTs and/or subscribers. For example, manager 225 may maintain in memory 222 a library of device public keys associated with the SDVR STTs in the cable TV system. When an SDVR STT is provided to a subscriber, a "public key-private key pair" has been assigned to the SDVR STT in anticipation of data encryption in accordance with a public key algorithm. The "device private key" of the SDVR STT is stored in a secure memory therein while the "device public key" may be transmitted to manager 225 through an RDC during an initialization process of the SDVR STT. Alternatively, during registration of the SDVR STT, the subscriber may provide the cable operator with the serial number of the SDVR STT, if the cable operator has not already had it, for the cable operator to look up the public key associated with the SDVR STT. The library of device public keys is illustrated in the form of a table, denoted 273 in FIG. 3. Device key table 273 comprises column 276 which includes an STID of each SDVR STT in the system, which is its MAC address in this instance. For example, SDVR STT 158-1 is identified by address MAC1 as mentioned before. Column 277 registers a device public key assigned to each respective STT. In this example, each device public key is 512 bits long. Referring to row 279-1, for example, STT 158-1 is assigned a public key denoted DPUBKEY-1. It should be noted that table 273 is intended for illustrative purposes only. In other embodiments, different identifiers, e.g., IP addresses, may be used in table 273 to identify various STTs in the network.

Figures 4, 5:
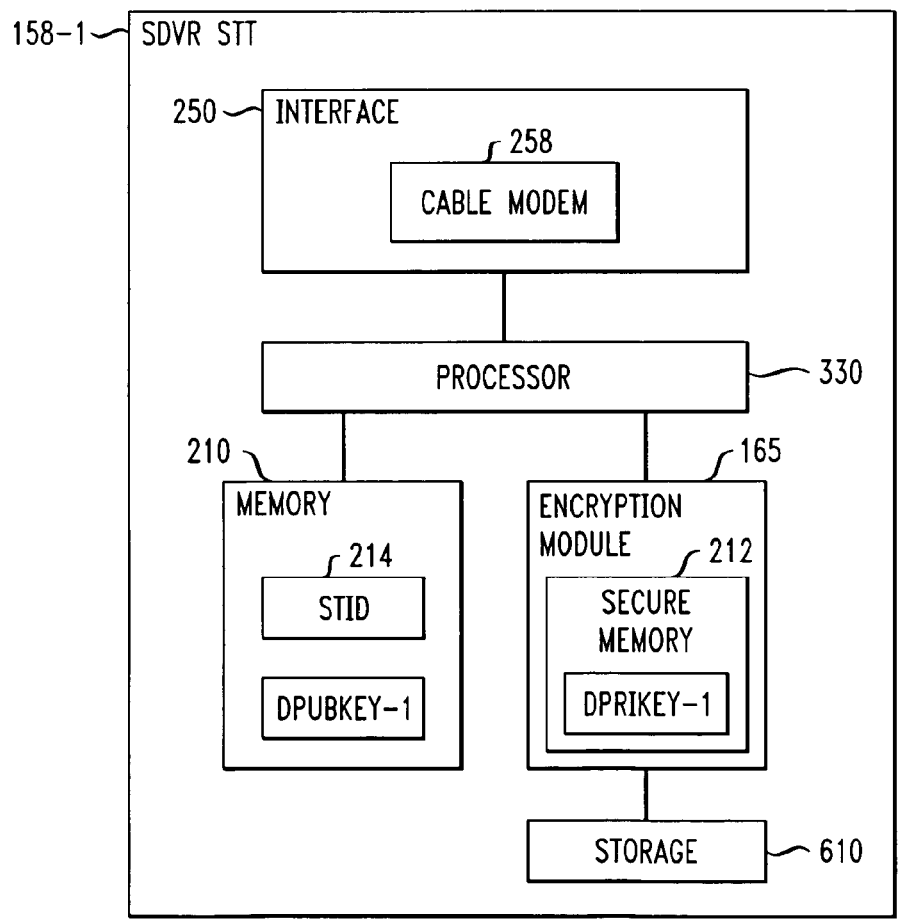
FIG. 4 illustrates a subscriber key table maintained in a headend of the system of FIG. 1.
FIG. 5 illustrates components of a first secure digital video recorder (SDVR) STT, in accordance with an embodiment of the invention.

In accordance with the invention, each subscriber associated with an SDVR STT is also assigned a public key-private key pair in anticipation of another data encryption in accordance with a public key algorithm Manager 225 may maintain a subscriber key table, denoted 283 in FIG. 4. Subscriber key table 283 includes column 286 which enumerates an identifier of each subscriber associated with an SDVR STT, e.g., S-I, S-2, S-3, etc. Columns 287 and 288 contain, respectively, a "subscriber public key" and the "subscriber private key" counterpart assigned to each subscriber. Referring to row 289-1, for example, subscriber S-1 is assigned a subscriber public key denoted SPUBKEY-1 and subscriber private key denoted SPRIKEY-1. Such a key pair may be assigned to each subscriber by the cable operator during a service registration by the subscriber. Because the subscriber private keys need to be kept secret, table 283 may be maintained by manager 225 in secure memory 227.

FIG. 5 illustrates components of a generic SDVR STT (e.g. 158-1) in accordance with the invention, which include, among others, processor 330, interface 250, memory 210, storage 610, and encryption module 165. Processor 330 orchestrates the operations of SDVR STT 158-1. Interface 250 includes cable modem 258 capable of demodulating signals containing programming content and data from in-band channels and FDCs, and modulating data signals onto RDCs. Interface 250 also performs other well-known formatting and reformatting functions necessary to transmit or receive programming content and data.

Memory 210 stores a variety of software applications and data including, e.g., an operating system (not shown) which provides the basic functionality for SDVR STT 158-1, and STID 214 for identifying SDVR STT 158-1, which is its MAC address MAC-I in this instance. Memory 210 may be, e.g., a non-volatile random-access memory.

The aforementioned device private key assigned to STT 158-1, namely, DPRIKEY-1, is stored in secure memory 212 in encryption module 165 in such a manner that it cannot be discovered or tampered with easily and certainly not without notice. On the other hand, the device public key assigned to SDVR STT 158-1, namely, DPUBKEY-I, a copy of which is registered in table 273 in headend 120 as discussed before, is stored in memory 210.

Storage 610 is used for storing programming content, which in this instance may be a removable hard disk drive. It will be appreciated that storage 610 may comprise other forms of memory including, e.g., a digital video disk (DVD)

drive, memory sticks, network-based storage, etc. Processor 330 may also perform such DVR functions as recording selected programming content in one or more content files, and storing them in storage 610. As used herein, the term "content file" refers to a container that holds a distinct quantity of programming content. A content file may contain, e.g., a digitally recorded version of a movie such as "Citizen Kane."

Cable operators have observed that providing to subscribers an unrestricted right to save programming content often results in an unacceptable amount of unauthorized copying. Accordingly, the aforementioned access control mechanism in accordance with the invention is implemented to prevent such unauthorized copying. In accordance with the inventive mechanism, encryption module 165 generates a content key, e.g., a 3DES key for encrypting, in accordance with a 3DES algorithm, a content file provided by processor 330 before its storage. In this illustrative embodiment, a different content key is generated for encrypting each respective content file. However, it will be appreciated that a single content key may be used to encrypt all content files in the same storage. It will also be appreciated that multiple content keys may be used to encrypt a single content file.

Figure 6:
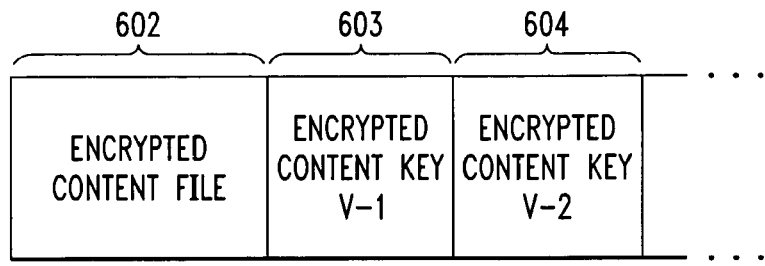
FIG. 6 illustrates storage in the first SDVR STT.

In addition, module 165 encrypts each generated content key to form "encrypted content key version 1 (V-1)," and "encrypted content key version 2 (V-2)", and stores the encrypted content key versions (denoted 603 and 604 respectively in FIG. 6) in association with the corresponding encrypted content file 602 (i.e., encrypted using the content key) in storage 610. In this illustrative embodiment, the encrypted content key V-I is formed by encrypting the content key with the device public key (i.e., DPUBKEY-1) assigned to SDVR STT 158-1. On the other hand, the encrypted content key V-2 is formed by encrypting the content key with the subscriber public key (i.e., SPUBKEY-1) assigned to subscriber S-1 associated with SDVR STT 158-1 in this instance.

Figure 7:
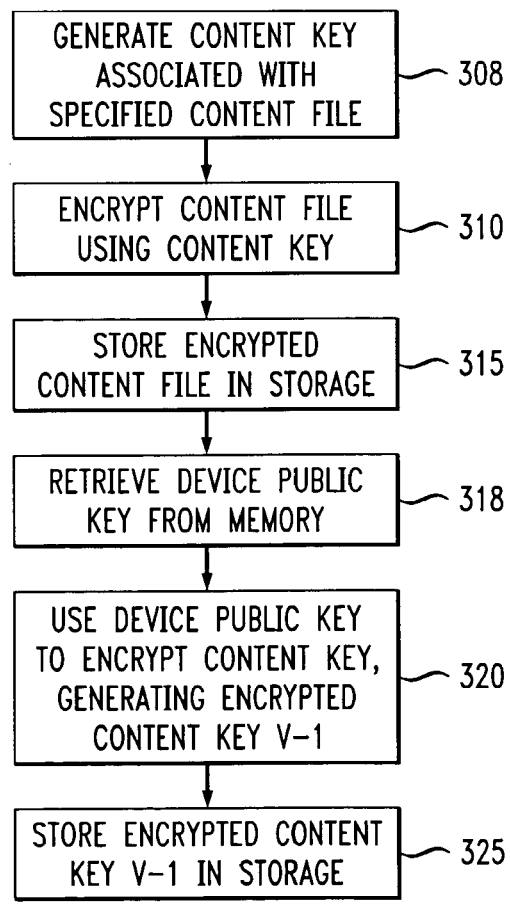
FIG. 7 is a flowchart depicting a routine for encrypting and storing a content file, in accordance with an embodiment of the invention.

By way of example, subscriber S-1 may direct SDVR STT 158-1 to record specified programming content, say, the "Citizen Kane" movie as it is broadcast over cable network 150. Accordingly, processor 330 generates a content file containing the specified movie content received from interface 250. FIG. 7 is a flowchart depicting a routine for encrypting and storing a content file. Instructed by such a routine, encryption module 165 at step 308 generates the aforementioned content key associated with the specified content file. At step 310, module 165 encrypts the content file using the content key, in accordance with the aforementioned 3DES algorithm. At step 315, module 165 stores the encrypted content file 602 in storage 610. At step 318, module 165 retrieves the device public key DPUBKEY-1 from memory 210. At step 320, module 165 uses DPUBKEY-1 to encrypt the content key in accordance with a first public key algorithm, e.g., an RSA algorithm. As mentioned above, the resulting encrypted content key is referred to as the "encrypted content key V-I." At step 325, module 165 stores the encrypted content key V-I, denoted 603, in storage 610. In one embodiment, the encrypted content key V 1 is stored in the form of meta data associated with the encrypted content file.

To generate the encrypted content key V-2, denoted 604, module 165 retrieves from storage 610 the encrypted content key V-I, from secure memory 212 device private key DPRIKEY-1, and from memory 210 STID 214 which is MAC-1 in this instance. Module 165 uses DPRIKEY-1 to decrypt the encrypted content key V-I, thereby recovering the content key in the clear. Module 165 then transmits the content key to headend 120 via an RDC in a secure manner. The secure transmission of a content key from STT 158-1 to headend 120 may be accomplished using a prior art encryption technique, e.g., a prior art public key encryption technique where a system private key is stored in head end 120, and the corresponding system public key is made public to, and stored in, all STTs including SDVR STT 158-1. In this instance, module 165 in SDVR STT 158-1 transmits, to control access manager 225 in application server 220, a message containing STID 214 and the content key encrypted using the system public key, in accordance with the prior art public key encryption technique.

Figure 8:
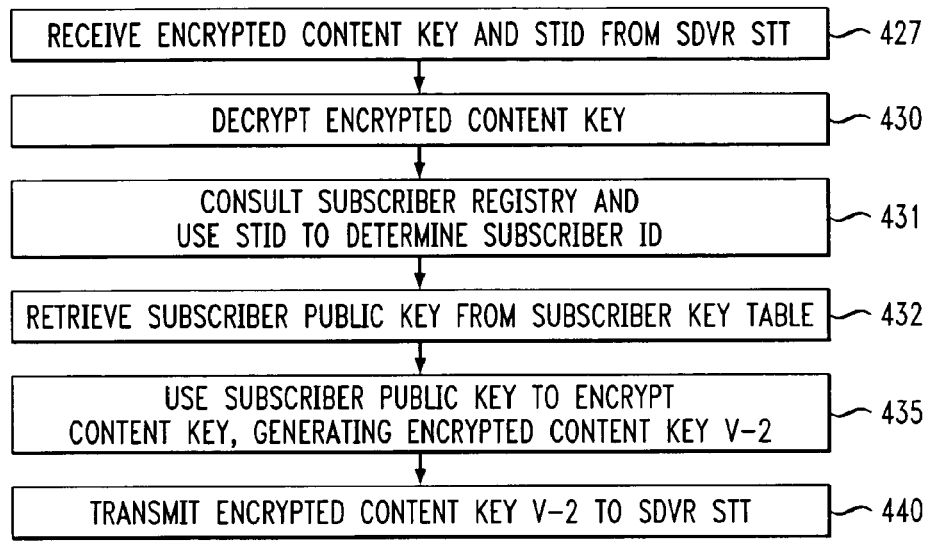
FIG. 8 is a flowchart depicting a routine for generating an encrypted content key associated with a subscriber, in accordance with an embodiment of the invention.

FIG. 8 is a flowchart depicting a routine for generating the encrypted content key V-2, in accordance with one embodiment. At step 427, manager 225 receives the encrypted content key and STID 214 in the message from SDVR STT 158-1, and at step 430 decrypts, using the aforementioned system private key, the encrypted content key to recover the content key in the clear. At step 431, manager 225 consults subscriber registry 360 and uses STID 214, which is MAC-1 in this instance, to determine the associated subscriber ID, which is S-1 in this instance.

At step 432, manager 225 retrieves from subscriber key table 283 the subscriber public key, SPUBKEY-1 associated with S-I. At step 435, manager 225 uses the subscriber public key SPUBKEY-1 to encrypt the content key in accordance with a second public key algorithm, thereby generating the encrypted content key V-2. At step 440, manager 225 transmits the encrypted content key V-2 to SDVR STT 158-1 via an FDC.

After receiving the encrypted content key V-2 from manager 225, module 165 stores the encrypted content key V-2, denoted 604 in storage 610. In one embodiment, the encrypted content key V-2 is stored in the form of meta data associated with the encrypted content file 602. To decrypt the encrypted content file 602 for viewing the "Citizen Kane" movie content, module 165 may decrypt the associated encrypted content key V-I (603) using DPRIKEY-1 in memory 212, thereby recovering the content key in the clear. Module 165 then applies the recovered content key to decrypt the encrypted content file 602.

Alternatively, STT 158-1 may be provided with the subscriber public key SPUBKEY-1. In a similar process used to create encrypted content key V-I, module 165 may use SPUBKEY-1 to generate encrypted content key V-2.

To show the portability of the encrypted content file 602, supposing that subscriber S-1 has purchased SDVR STT 158-2 for use as a second STT in his or her home, he or she may wish to transfer the content file to SDVR STT 158-2 and watch the program on a television set connected to SDVR STT 158-2. Alternatively, supposing that SDVR STT 158-1 is broken or is no longer functional for any reason, subscriber S-1 may wish to use SDVR STT 158-2 to view the stored programming content. To permit subscriber S-1 to copy the programming content for limited purposes such as these, the invention relies on encrypted content key V-2 (604), which is not associated with any particular device, to "migrate" programming content stored on a first device (e.g., STT 158-1) to a second device (e.g., STT 158-2). Specifically, in order for the second device to obtain the content key to decrypt the copy of the encrypted content file in STT 158-2, the latter needs an encrypted content key V-I associated therewith. In accordance with an aspect of the invention, the content key V-I associated with STT 158-2 can be successfully derived from the encrypted content key V-2 (604) provided that the subscriber associated with STT 158-2 be also S-I, which is the case here and reflected by subscriber registry 360 in FIG. 2. Referring to rows 368-1 and 368-2 of registry 360, in this instance both STT 158-1 having the MAC-1 address and STT 158-2 having the MAC-2 address are associated with S-I.

Figure 9:
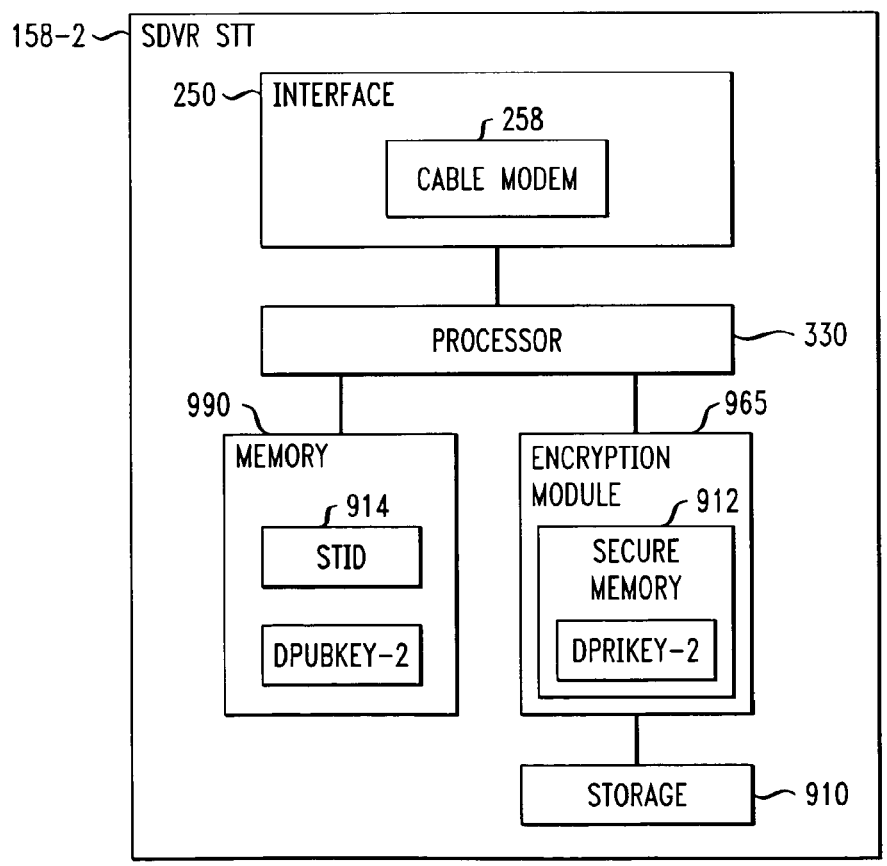
FIG. 9 illustrates components of a second SDVR STT, in accordance with an embodiment of the invention.
Figure 10:
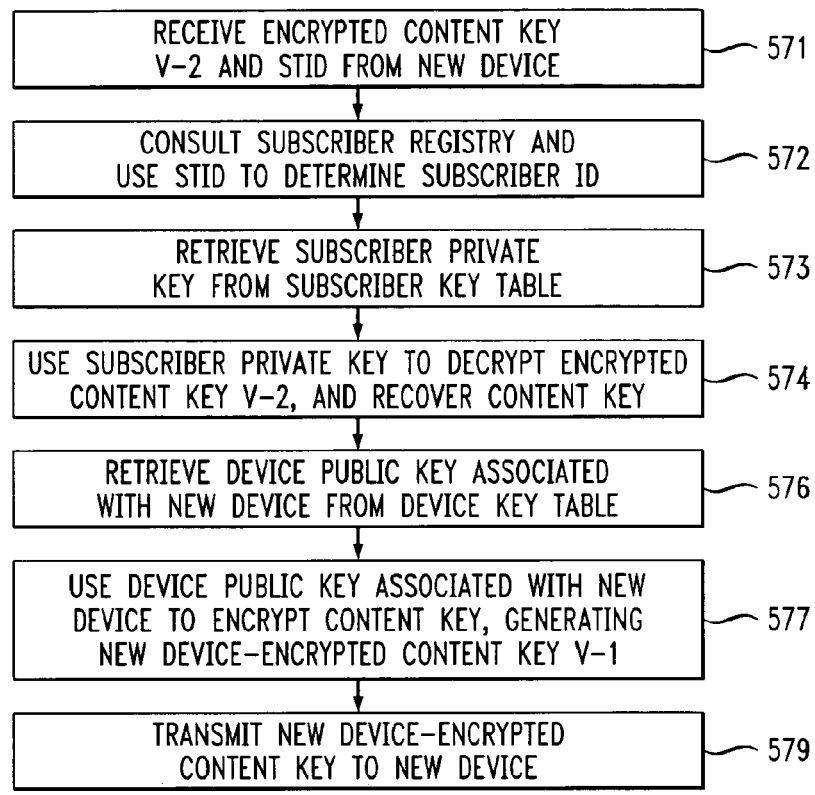
FIG. 10 is a flowchart depicting a routine for generating an encrypted content key associated with the second SDVR STT, in accordance with an embodiment of the invention.

Assuming that SDVR STT 158-2 in FIG. 9 has in storage 910 a copy of the encrypted content file 602 and an encrypted content key V-2 (604) from SDVR STT 158-1 (e.g., by physically removing storage 610 from SDVR STT 158-1 to SDVR STT 158-2, i.e., storage 610 the same as storage 910), encryption module 965 of STT 158-2 retrieves the encrypted content key V-2 (604) from storage 910, and STID 914 from memory 990. Module 965 transmits a message containing the encrypted content key V-2 (604) and STID 914 to headend 120.

At headend 120, the encrypted content key V-2 (604) is utilized to generate an encrypted content key V-I associated with the SDVR STT 158-2, which is needed for STT 158-2 to derive the content key for decrypting the encrypted content file 602. FIG. 1O is a flowchart depicting a routine for generating an encrypted content key V-I associated with STT 158-2, in accordance with an embodiment of the invention. At step 571, manager 225 in headend 120 receives from the new device STT 158-2 the encrypted content key V-2 (604) and STID 914. At step 572, manager 225 consults subscriber registry 360, and uses STID 914 (i.e., MAC-2) to determine the corresponding subscriber ID (i.e., S-I). At step 573, manager 225 retrieves from subscriber key table 283 the subscriber private key SPRIKEY-1 associated with subscriber S-I. At step 574, manager 225 uses the subscriber private key to decrypt the encrypted content key V-2 (604) and thereby recover the content key in the clear.

At step 576, manager 225 consults device key table 273 and retrieves the device public key DPUBKEY-2 associated with STID 914 which is MAC-2 in this instance. At step 577, manager 225 uses the device public key DPUBKEY-2 associated with STT 158-2 to encrypt the content key. The resulting encrypted version of the content key is referred to as the "new-device (ND) encrypted content key version 1 (V-I)." At step 579, manager 225 transmits the ND encrypted content key V-I to STT 158-2 through an FDC.

Module 965 in SDVR STT 158-2 receives the ND encrypted content key V-I from headend 120. Module 965 stores the ND content key V-I in storage 910. At a subsequent point in time, module 965 may retrieve device private key DPRIKEY-2 from memory 912, and use it to decrypt the ND encrypted content key V-I and recover the content key. Module 965 may then utilize the content key to decrypt the encrypted content file 602 for viewing the "Citizen Kane" movie content.

In a second embodiment, a system-wide public key-private key pair is used in place of the subscriber key pairs stored in table 283. A system public key is made public to a collection of STTs in the network. A system private key (not shown) is stored in headend 120 by manager 225, e.g., in memory 227. Thus, for example, in this second embodiment after SDVR STT 158-1 uses a content key to encrypt a content file, resulting in encrypted content file 602, it uses the system public key (not shown) in memory 210 to encrypt the content key, thereby generating an encrypted content key V-2. SDVR STT 158-1 stores the encrypted content key V-2 in association with content file 602. It should be noted that the encrypted content key V-I in SDVR STT 158-1 remains the same as the previous embodiment.

To realize portability of the content file, SDVR STT 158-1 may transfer the content file and encrypted content key V-2 therein to a second device, e.g., SDVR STT 158-2, an encrypted content key V-I associated with SDVR STT 158-2 may be generated as follows. Module 965 in SDVR STT 158-2 transmits the received encrypted content key V-2 to headend 120. Manager 225 in headend 120 receives the encrypted content key V-2, retrieves the system private key from memory 227, and uses it to decrypt the encrypted content key V-2, recovering the content key in the clear. Manager 225 then consults device key table 273 and retrieves the device public key DPUBKEY-2 associated with SDVR STT 158-2. Manager 225 uses the device public key DPUBKEY-2 to encrypt the content key, producing an ND encrypted content key V-I. The ND encrypted content key is transmitted to SDVR STT 158-2, where it is stored in storage 910 in association with content file 602. It should be noted that the ND encrypted content key V-2, also stored in storage 910, is the same as the received encrypted content key V-2 from SDVR STT 158-1. At a subsequent point in time, module 965 may retrieve device private key DPRIKEY-2 from memory 912, and use it to decrypt the ND encrypted content key V-I and recover the content key. Module 965 may then utilize the content key to decrypt the encrypted content file 602 for viewing the "Citizen Kane" movie content.

Figure 11:
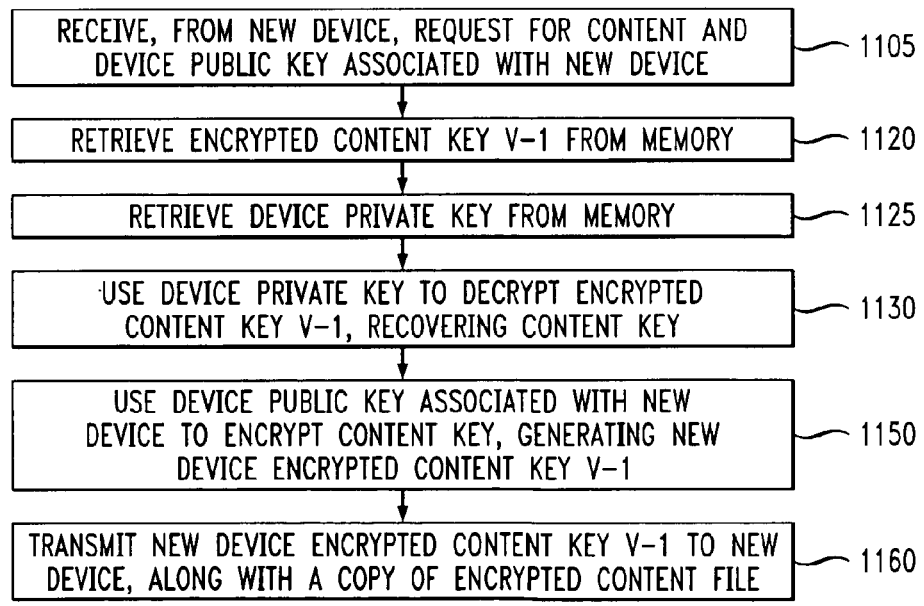
FIG. 11 is a flowchart depicting a routine for transferring a content file from a first device to a second device, e.g., via a home network, in accordance with an embodiment of the invention.

In a third embodiment, a subscriber may transfer content from one device to another, e.g., via a home network without involving headend 120, and control access manager 220 in -15 particular. For example, subscriber S-1 establishes a home network within his/her home and connects both SDVR STT 158-1 and SDVR STT 158-2 to the network. The "Citizen Kane" movie is stored in the form of encrypted content file 602 in storage 610 of SDVR STT 158-1 as described before. Suppose that subscriber S-1 wishes to transfer a copy of encrypted content file 602 from SDVR STT 158-1 to SDVR STT 158-2 via the home network. FIG. 11 is a flowchart depicting a routine for transferring one such content file from a first device to a second device. SDVR STT 158-2 may act as an initiator and transmit to SDVR STT 158-1 a request for a copy of content file 602. SDVR STT 158-2 may also transmit to SDVR STT 158-1 its own device public key, which is in this instance DPUBKEY-2.

Module 165 receives the request and the device public key associated with SDVR STT 158-2 (step 1105), and in response, identifies the desired content file 602 in storage 610. At step 1120, module 165 retrieves encrypted content key V-I (603) from storage 610. At step 1125, module 165 retrieves DPRIKEY-1 from memory 212 and (at step 1130) uses DPRIKEY-1 to decrypt encrypted content key V-I (603), thereby recovering the content key in the clear. At step 1150, module 165 uses the received DPUBKEY-2 to encrypt the recovered content key. The resulting encrypted version of the content key becomes the ND encrypted content key V-I. At step 1160, module 165 transmits the ND encrypted content key V-I to SDVR STT 158-2, along with a copy of encrypted content file 602.

Module 965 in SDVR STT 158-2 receives the ND encrypted content key V-I from SDVR STT 158-1. Module 965 stores the ND content key V-I and content file 602 in storage 910. At a subsequent point in time, module 965 may retrieve device private key DPRIKEY-2 from memory 912, and use it to decrypt the ND encrypted content key V-I and recover the content key in the clear. Module 965 may then utilize the content key to decrypt the encrypted content file 602 for viewing the "Citizen Kane" movie content.

The foregoing merely illustrates the principles of the invention. It will thus be appreciated that those skilled in the art will be able to devise numerous other arrangements which embody the principles of the invention and are thus within its spirit and scope.

For example, while STTs are illustratively used in the above-described embodiments, other comparable or functionally equivalent devices (e.g., point-of-deployment (POD) or CableCARD™ devices) may be used in addition to, or in lieu of, such STTs.

In addition, in the embodiment shown in FIG. 1, the network transport is illustratively 5 realized using HFC cable network 150. However, other networks such as digital subscriber line (DSL) networks, ethernet networks and satellite networks may be used, instead.

Finally, the system components of FIG. 1 are disclosed herein in a form in which various functions are performed by discrete functional blocks. However, anyone or more of these functions could equally well be embodied in an arrangement in which the functions of anyone or more of those blocks or indeed, all of the functions thereof, are realized, for example, by one or more appropriately programmed processors.

What is claimed is:

1. A method for use in a first client device of a content distribution network for decrypting encrypted content with a cryptographic element, said network comprising at least a network entity and a plurality of client devices, said method comprising:
   receiving said encrypted content at said first client device from a second client device;
   receiving a first encrypted version of said cryptographic element at said first client device from said second client device, said first encrypted version of said cryptographic element being generated by encrypting said cryptographic element using a second cryptographic element associated with a common user of said first and second devices;
   receiving a second encrypted version of said cryptographic element at said first device from said network entity;
   deriving said cryptographic element using at least one of said first and second encrypted versions of said cryptographic element; and
   decrypting said encrypted content using said cryptographic element.

2. The method of claim 1, wherein said method further comprises providing said first encrypted version of said cryptographic element to said network entity, said network entity adapted to recover said cryptographic element based at least in part on said first encrypted version of said cryptographic element and data representative of said common user, and generate said second encrypted version of said cryptographic element.

3. The method of claim 2, wherein said second encrypted version of said cryptographic element is generated by encrypting said cryptographic element using a third cryptographic element, said third cryptographic element being associated with said first client device, said network entity providing said second encrypted version of said cryptographic element to said first client device.

4. The method of claim 1, wherein said content distribution network comprises a managed network, said second client device comprises a set-top box, and said first client device comprises a digital video recorder (DVR).

5. The method of claim 4, wherein said set-top box comprises at least a portion of a trusted domain.

6. The method of claim 1, wherein said first and said second cryptographic elements comprise encryption keys generated in accordance with a public key encryption algorithm.

7. Network apparatus configured to enable decryption of encrypted content in a client premises device (CPE) remote from said network apparatus, said encrypted content in said device being decrypted using a content key, said network apparatus comprising:
   an interface configured to receive a first encrypted content key from said CPE remote from said network apparatus;
   a database configured to, upon a query, determine a user of said CPE, and to supply a first cryptographic element associated with said user of said CPE;
   an entity configured to recover said content key via decryption of said first encrypted content key using said first cryptographic element;
   an apparatus configured to generate a second encrypted content key via encryption of said recovered content key using a second cryptographic element associated with said CPE; and
   a server configured to provide at least said second encrypted content key to said CPE, said content key recoverable based at least on said second encrypted content key.

8. The apparatus of claim 7, wherein said first cryptographic element is identified based on at least data representative of said user of said CPE.

9. The apparatus of claim 8, wherein said data includes an identity of said user.

10. The apparatus of claim 7, wherein said content key includes a secret key in accordance with a Data Encryption Standard (DES) technique.

11. The apparatus of claim 7, wherein said first cryptographic element includes an encryption key in accordance with a public key algorithm.

12. The apparatus of claim 7, wherein said second cryptographic element includes an encryption key in accordance with a public key algorithm.

13. The apparatus of claim 7, wherein said content includes entertainment programming content.

14. A client device configured to decrypt encrypted content using a cryptographic element, said client device in communication with a content distribution network, said network comprising at least a network entity and a plurality of second client devices, said client device comprising:
   a first interface configured to receive said encrypted content from one of said plurality of second client devices;
   a second interface configured to receive a first encrypted version of said cryptographic element from said one of said plurality of second client devices, said first encrypted version of said cryptographic element being generated via encryption of said cryptographic element using a second cryptographic element associated with a common user of said client device and said one of said plurality of second client devices;
   a third interface configured to receive a second encrypted version of said cryptographic element from said network entity;
   a processor apparatus configured to execute at least computer program, said computer program comprising a plurality of instructions which are configured to, when executed:
      derive said cryptographic element using at least one of said first and second encrypted versions of said cryptographic element; and
      decrypt said encrypted content using said cryptographic element.

15. The client device of claim 14, wherein said plurality of instructions are further configured to, when executed, provide said first encrypted version of said cryptographic element to said network entity, said network entity configured to recover said cryptographic element based at least in part on said first encrypted version of said cryptographic element and data representative of said common user, and generate said second encrypted version of said cryptographic element.

16. The client device of claim 15, wherein said second encrypted version of said cryptographic element is generated via encryption of said cryptographic element using a third cryptographic element, said third cryptographic element being associated with said client device; and wherein said client device further comprises an interface configured to receive said second encrypted version of said cryptographic element from said network entity.

17. The client device of claim 14, wherein said content distribution network comprises a managed network, said one of said plurality of second client devices comprises a set-top box, and said client device comprises a digital video recorder (DVR).

18. The client device of claim 17, wherein said set-top box comprises at least a portion of a trusted domain.

19. The client device of claim 14, wherein at least one of said first and said second cryptographic elements comprises an encryption key generated in accordance with a public key encryption algorithm.

* * * * *